United States Patent
Johnson

(10) Patent No.: US 7,617,949 B2
(45) Date of Patent: Nov. 17, 2009

(54) FLOW VOLUME LIMITING DEVICE

(75) Inventor: Dwight N. Johnson, Carlsbad, CA (US)

(73) Assignee: Kevin Brown, Oceanside, CA (US)

( * ) Notice: Subject to any disclaimer, the term of this patent is extended or adjusted under 35 U.S.C. 154(b) by 714 days.

(21) Appl. No.: 11/303,494

(22) Filed: Dec. 16, 2005

(65) Prior Publication Data

US 2007/0138201 A1 Jun. 21, 2007

(51) Int. Cl.
*G01F 11/00* (2006.01)
*E03B 1/00* (2006.01)

(52) U.S. Cl. .............................. 222/20; 222/14; 137/12; 137/47

(58) Field of Classification Search ................... 222/20, 222/14, 18; 137/12, 10, 47
See application file for complete search history.

(56) References Cited

U.S. PATENT DOCUMENTS

| 998,089 | A | | 7/1911 | Hansen | |
|---|---|---|---|---|---|
| 1,859,357 | A | * | 5/1932 | Elder | 137/119.07 |
| 1,928,086 | A | * | 9/1933 | Barr | 222/16 |
| 3,097,762 | A | | 7/1963 | Charnota et al. | |
| 3,187,943 | A | * | 6/1965 | Wolf | 222/20 |
| 3,473,695 | A | * | 10/1969 | Anesi | 222/20 |
| 3,497,106 | A | | 2/1970 | Clarke | |
| 3,507,420 | A | | 4/1970 | Nelson et al. | |
| 3,810,562 | A | | 5/1974 | Clarke | |
| 3,902,201 | A | | 9/1975 | Bobo | |
| 4,023,708 | A | | 5/1977 | Fornasari | |
| 4,202,467 | A | * | 5/1980 | Rutten et al. | 222/20 |
| 4,825,895 | A | | 5/1989 | Maltman | |
| 5,207,354 | A | * | 5/1993 | Hsu et al. | 222/16 |
| 5,622,618 | A | | 4/1997 | Brane et al. | |
| 5,997,734 | A | | 12/1999 | Koski | |

* cited by examiner

*Primary Examiner*—Kevin P Shaver
*Assistant Examiner*—Stephanie E Tyler
(74) *Attorney, Agent, or Firm*—Greer, Burns & Crain, Ltd.

(57) ABSTRACT

A turbine wheel and gear system rotate an output shaft in response to flow, where the output shaft is connected to a clutch cup that engages a clutch and valve disk. The disk cooperates with a valve seat formed on a piston to permit/prevent flow within the piston. During flow, the clutch clamps to the disk, and the piston and disk move downstream until an associated control member hits a stop, opening the valve (as the disk stops), while the piston continues downstream. The clutch rotates the disk and control member, and if a maximum flow volume occurs, the control member rotates to an interrupt position and is released from the stop, closing the valve. Passages allow restricted flow to disengage the clutch and permit a spring to move the piston and valve upstream until engaging a reset cam that rotates the control member back to an initial position.

21 Claims, 6 Drawing Sheets

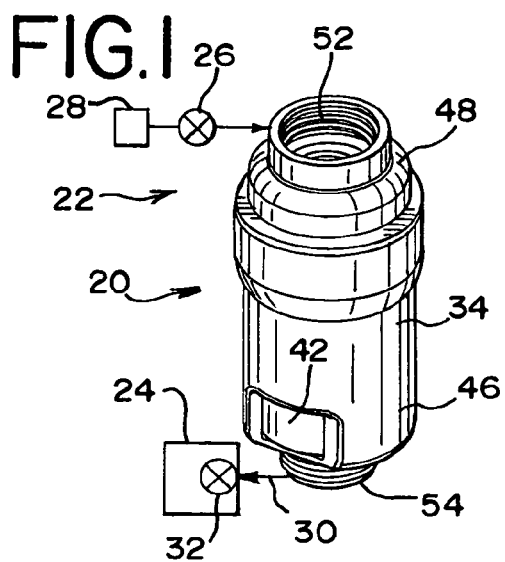
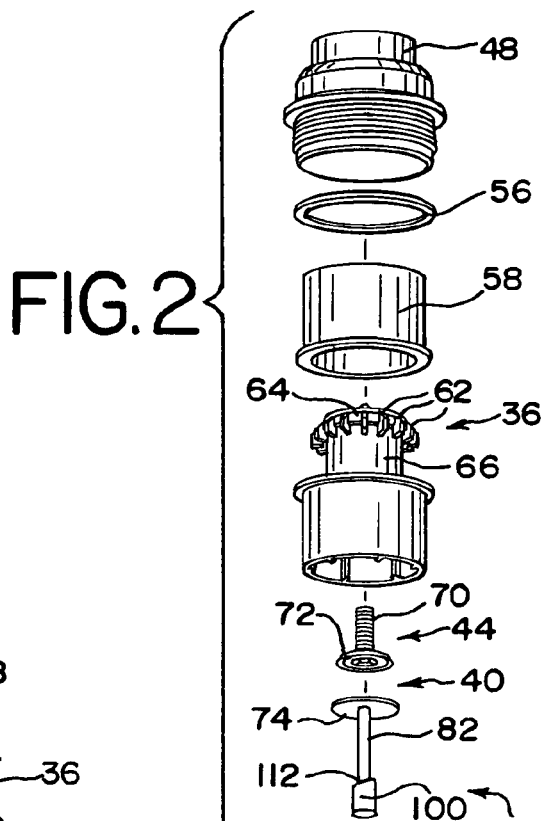
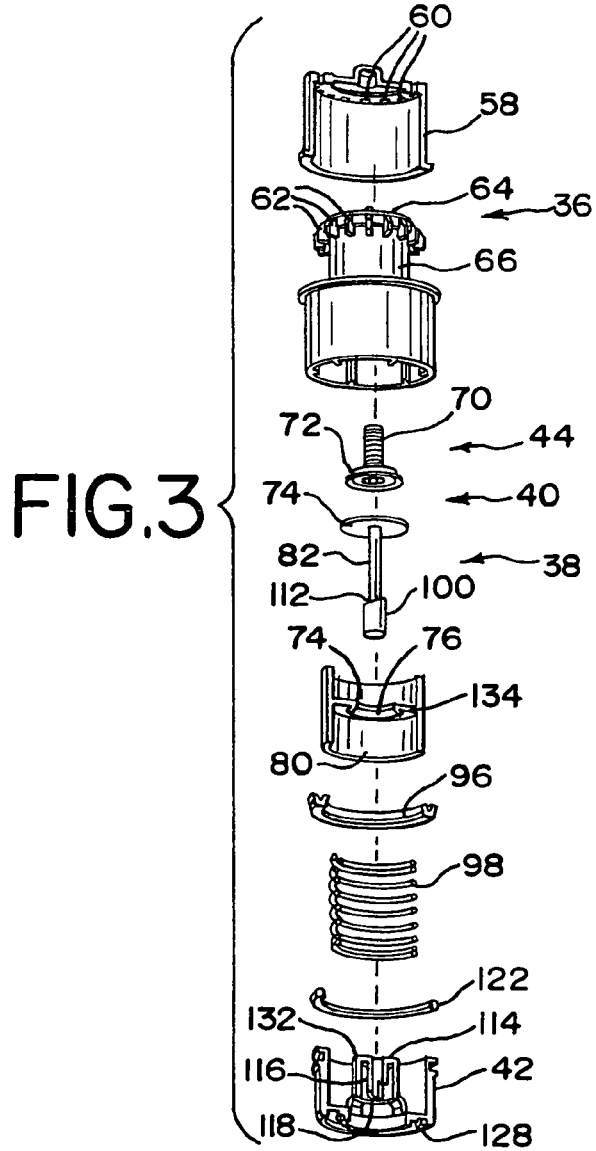

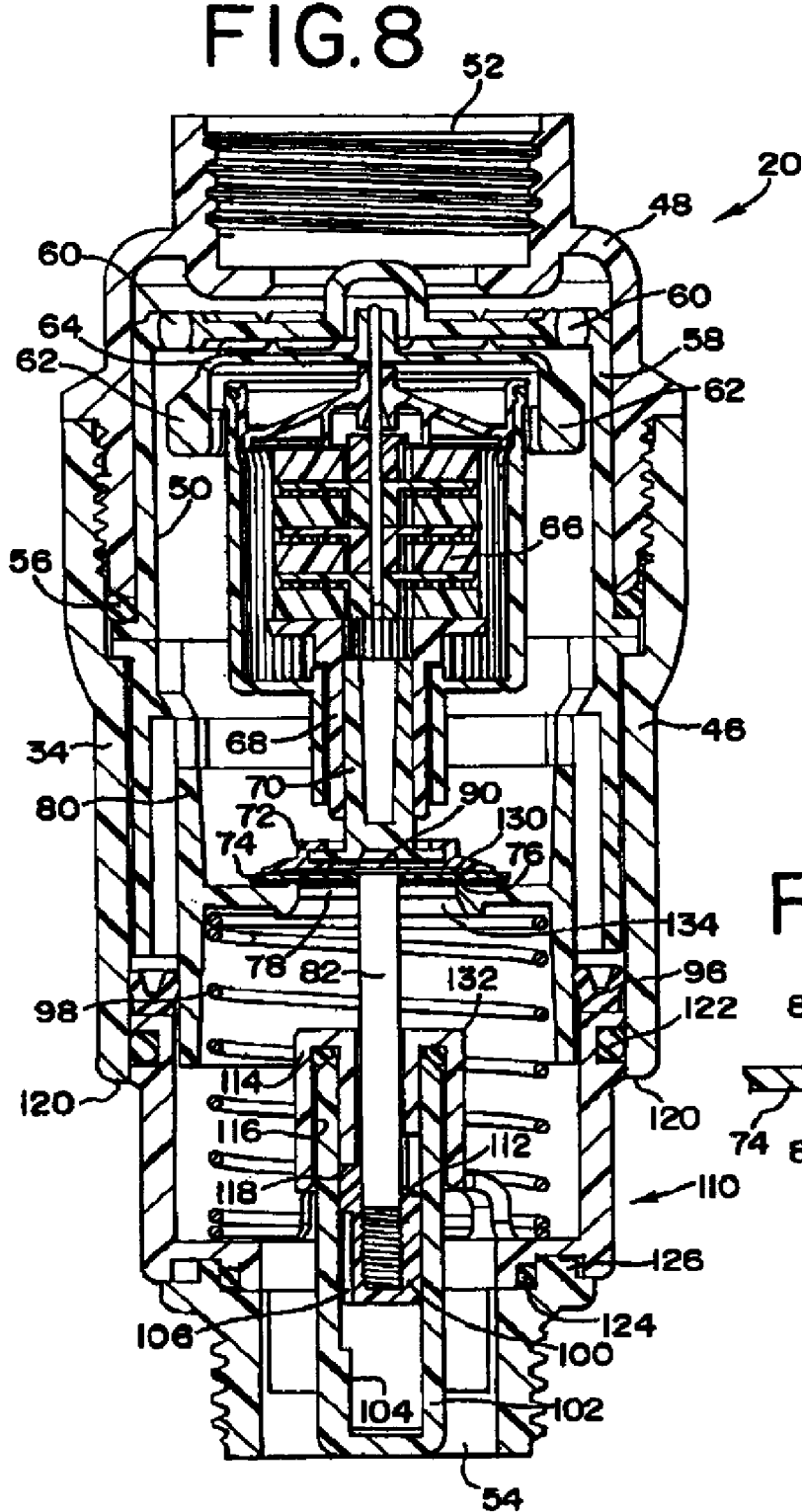
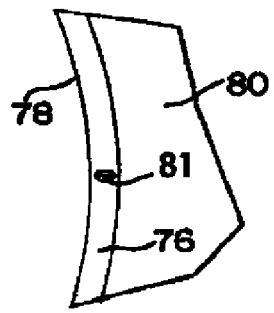
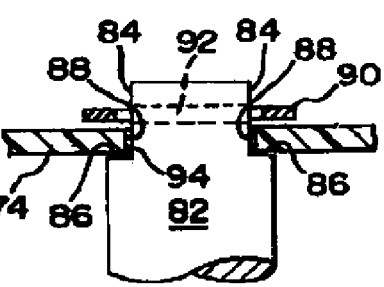

FLOW VOLUME LIMITING DEVICE

FIELD OF THE INVENTION

The present invention relates to an improved flow volume limiting device for discontinuing flow when a metered flow volume occurs.

DESCRIPTION OF THE PRIOR ART

There are applications where it is desirable to prevent liquid flow from exceeding a maximum flow volume. For one example, such a device can be used to supply water to an appliance such as a washing machine and prevent flooding in the event of failure of a component such as a flexible water supply hose. Many devices are known for delivering a metered volume of liquid in a cycle of operation. Most known devices require manual reset prior to each cycle of operation, and are not suitable for automatically limiting the volume of flow to an appliance.

U.S. Pat. No. 998,089 discloses a fluid meter with a valve that discontinues flow when a predetermined volume of flow has occurred. The predetermined volume is set by manually rotating an arm from a home position, and simultaneously a opening a flow valve against the force of a spring. A vane wheel is rotated by flow through the meter, and gears rotate the arm back toward the home position. When a predetermined volume of flow occurs, the indicator arm returns to the home position to release a catch lever and the spring closes the valve.

In general, the flow volume limiting device 20 includes a housing 34 containing a volume measuring assembly 36 for measuring the volume of liquid that flows through the device 20 and a flow interrupt assembly 38 including a valve assembly 40 for discontinuing flow if the measured flow reaches a maximum amount. An adjustment member or collar 42 is used to select a desired maximum volume. A clutch assembly 44 interconnects the volume measuring assembly 36 to the flow interrupt assembly 38 for simultaneous movement in response to measured flow, or alternatively disconnects the volume measuring assembly 36 from the flow interrupt assembly 38 for reset of the components of the device 20 to their initial condition.

U.S. Pat. No. 3,497,106 discloses a flowmeter with a knob that is rotated to select an amount of liquid for delivery. Liquid flow rotates an impeller and drive gears rotate a cam. When the selected volume of liquid is delivered, a notch on the cam aligns with a push rod and a spring biased valve closes to discontinue liquid flow. U.S. Pat. No. 3,810,562 discloses a flowmeter similar in some respects to the flowmeter of U.S. Pat. No. 3,497,106, and further including a clutch means for rendering the rotary cam inoperative so that liquid can be delivered without metering. A pointer is rotated and a stationary cam lifts a shaft and the rotary dam to disengage it from the gear drive.

U.S. Pat. No. 3,902,201 discloses a plumbing valve for delivering a metered volume of water to a toilet flush tank. This device does not require manual reset prior to an operating cycle, but does require manual operation to initiate a liquid delivery cycle. At the beginning of a flushing operation, a manually movable lever moves a follower to open a valve. The valve is briefly latched open by a swing lever. Flow rotates a turbine that operates though a reducer to rotate a cam until the follower aligns with a notch in the cam and the valve closes.

U.S. Pat. No. 4,023,708 discloses a safety device for preventing flooding by providing a measured volume of flow to a washing machine. This device requires no manual setting or resetting. Flow though the device rotates a turbine wheel that operates through gears to rotate a valve member having a hub with teeth. After a predetermined flow volume, the teeth align with notches and a spring closes the valve. When pressure is discontinued, the valve spring moves the valve and hub against an inclined surface of a cap, rotating the valve and hub back to their initial positions. To permit rotation of the valve and hub relative to the gears and turbine, the gears are mechanically unmeshed, and must be reengaged before the next delivery cycle.

SUMMARY OF THE INVENTION

A primary object of the present invention is to provide an improved device for limiting liquid flow to a maximum metered volume. Other objects are to provide a flow volume limiting device that operates and resets automatically; to provide a device that includes an elastomeric friction clutch providing a simple and reliable way to couple or uncouple the rotary drive connection between a flow measuring system and a valve control member; to provide a device with a simple and reliable valve controlling arrangement including a valve piston with a valve seat cooperating with a valve disk; to provide a device with a simple construction resulting from use of a disk as both a valve member and as a component of the clutch; and to provide a simple and reliable automatic and adjustable flow volume limiting device overcoming problems encountered with known flow volume limiting devices.

In brief, in accordance with the present invention, there is provided a flow volume limiting device for use in a liquid supply system. The device includes a housing defining a flow path. A flow responsive piston slides along the flow path in downstream and upstream directions and a spring biases the piston in the upstream direction. A flow passage through the piston is surrounded by a valve seat on the piston. A valve member cooperates with the valve seat to permit and prevent flow through the flow passage. A control element is connected to the valve member and a stop is engaged by the control member to stop downstream movement of the control member and valve during downstream movement of the piston to separate the valve member from the valve seat. A flow volume measuring assembly has an output shaft rotating in response to flow in the flow path. A friction clutch interconnects the flow measuring assembly and the control element for rotating the control element in a first direction when the clutch is engaged. The friction clutch is exposed to a liquid pressure differential in the flow path for engaging the clutch when flow is present and disengaging the clutch when flow is absent. A recess in the control element registers with the stop permitting downstream movement of the valve member against the valve seat in response to rotation of the control element to an interrupt position. A reset cam is engaged by the control element for rotating the control element in a second direction to an initial position in response to upstream movement of the control element

BRIEF DESCRIPTION OF THE DRAWING

The present invention together with the above and other objects and advantages may best be understood from the following detailed description of the preferred embodiment of the invention illustrated in the drawings, wherein:

FIG. 1 is a side and top isometric view of a flow volume limiting device constructed in accordance with the present invention, connected in a water system shown schematically in a block diagram;

FIG. 2 is a side and bottom exploded isometric view of the flow volume limiting device;

FIG. 3 is an enlarged view of a portion of FIG. 2 with components of the flow volume limiting device seen in cross section;

FIG. 8 is a view like FIG. 4 showing the device being reset;

FIG. 9 is fragmentary, enlarged view of part of the valve seat of the piston of the valve assembly of the device; and FIG. 10 is an enlarged fragmentary view, partly in cross section of the mounting of the valve and clutch disk of the device.

DETAILED DESCRIPTION OF THE PREFERRED EMBODIMENT

Figure 4:
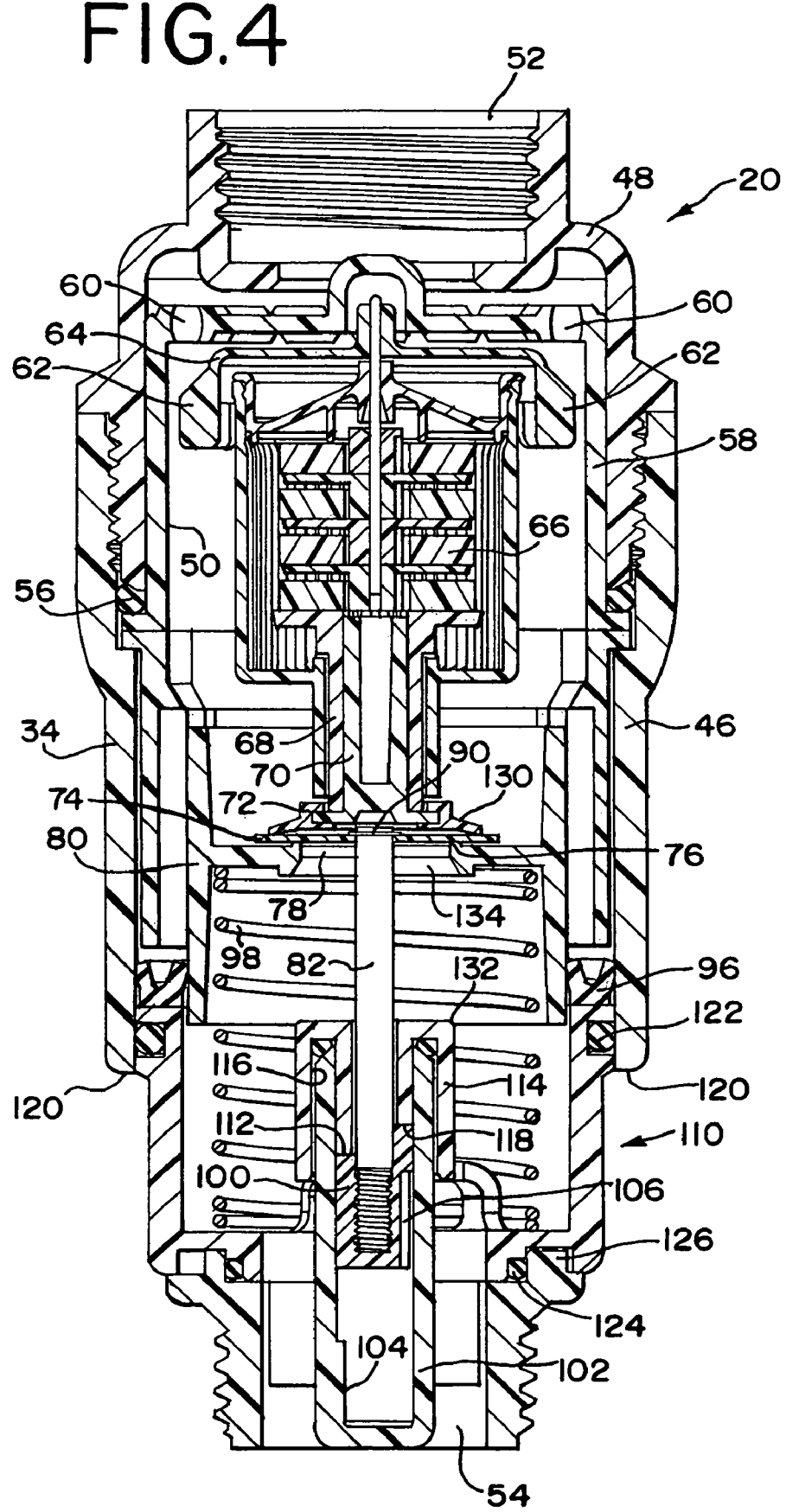
FIG. 4 is an enlarged view, in cross section taken along the longitudinal axis, of the flow volume limiting device in a standby, no flow condition.

Having reference now to the drawing, and initially to FIG. 1, there is illustrated a flow volume limiting device generally designated as 20 and constructed in accordance with the principles of the present invention. The device 20 may be employed in applications where it is desired to limit the measured volume of liquid flow to a maximum value.

In FIG. 1, the device 20 is connected in a water supply system 22 of a water utilizing device or appliance 24 such as a clothes washing machine. In this application, a supply valve 26 such as a wall faucet normally continuously connects water from a pressurized source 28, such as a household water supply, through a conduit such as a flexible hose 30 to a solenoid operated inlet control valve 32 of the washing machine 24. In the absence of the device 20, if there were a failure such as a rupture of hose 30 or a malfunction of the control valve 32, uncontrolled flow and flooding could occur. For simplicity, only a single water supply connection to the appliance 24 is shown. However, a typical clothes washer installation includes both hot and cold water supply connections, and both of these may be equipped with a device 20.

The flow volume limiting device 20 of the invention prevents uncontrolled flow and flooding by metering the volume of water supplied to the appliance 24 and discontinuing flow if a maximum flow volume occurs. The maximum flow volume is selected to have a value sufficient for normal operation of the appliance 24 so that the operation of the appliance 24 is not disturbed unless there is a failure in the water system 22. The device 20 performs the metering and flow interrupt functions, and also resets itself, automatically without the need for manual control or inputs.

In general, the flow volume limiting device 20 includes a housing 34 containing a volume measuring assembly 36 for measuring the volume of liquid that flows through the device 20 and a flow interrupt assembly 38 including a valve assembly 40 for discontinuing flow if the measured flow reaches a maximum amount. An adjustment member or collar 42 is used to select a desired maximum volume. A clutch assembly 44 interconnects the volume measuring assembly 36 to the flow interrupt assembly 38 for simultaneous movement in response to measured flow, or alternatively disconnects the volume measuring assembly 36 from the flow interrupt assembly 38 for reset of the components of the device 20 to their initial condition.

The housing 34 includes a base 46 and a cap 48 threaded onto the base 46 to define an internal flow cavity 50 extending between an inlet filling 52 in the cap 48 and an outlet fitting 54 in the base 46. A seal 56 seals the cavity 50. For use in the water system 22 of FIG. 1, the inlet fitting 52 is a female threaded fitting adapted to mate with the male threaded fitting of a conventional water supply faucet 26. The outlet fitting 54 is a male threaded fitting adapted to be connected to the female threaded fitting of a conventional hot or cold water supply hose 30. For other applications of the device 20, other types of inlet and outlet fittings can be used.

The flow volume measuring assembly generally designated as 36 includes a cup shaped inlet flow guide 58 received within the cap 36. Guide 58 includes peripheral flow ports 60 that direct inlet flow from the inlet 52 toward vanes 62 of a turbine wheel 64. Preferably the vanes 62 are oriented parallel to the central longitudinal axis of the device 20 and the flow ports 60 extend through the wall of the guide 58 in a non axial direction so that they impart a rotational or spiral swirling motion to the flow of water for turning the turbine wheel 64. This reduces axial thrust, friction and wear and increases component life. Turbine wheel rotation is relatively fast and is directly proportional to flow volume through the device 20. A speed reduction gear assembly 66 provides a slow speed output rotation to an output shaft 68 of the gear assembly 66. For example, turbine wheel rotation of about 1,800 RPM may be reduced by the gear assembly to a single rotation of the output shaft 68. Peripheral rims of the flow guide 58 and the gear assembly 66 are clamped against the seal 56 between the base 46 and cap 48.

The clutch assembly generally designated as 44 releaseably connects the flow volume measuring assembly 36 including the turbine wheel 64 and the gear assembly 66 to the flow interrupt assembly generally designated as 38. A drive shaft 70 is connected by splines to the gear assembly output shaft 68 so that the drive shaft 70 is axially movable relative to and rotates together with the output shaft 68. The lower end of the drive shaft 70 carries a flexible, resilient clutch member 72 made of rubber or a similar elastomeric material.

The clutch member 72 cooperates with a valve and clutch disk 74 to either permit or prevent rotation of the disk 74 relative to the clutch member 72. In the clutch engaged condition seen in FIGS. 5 and 6, the clutch assembly 44 is engaged and the disk 74 cannot slip or rotate relative to the clutch member 72. In this condition, a rotary connection is established between the flow measuring assembly 36 and the flow interrupt assembly 38. In the clutch disengaged condition seen in FIGS. 4, 7 and 8, the clutch assembly 44 is released and the disk 74 can slip or rotate relative to the clutch member 72. In this condition, the flow interrupt assembly 38 is disconnected or uncoupled from the flow volume measuring assembly 36.

In addition to the valve and clutch disk 74, the valve assembly 40 includes a circular valve seat 76 surrounding a circular flow port or passage 78 formed in a piston 80. When the disk 74 is in engagement with the seat 76 (FIGS. 4, 5 and 8), the valve assembly 40 is closed and there is no substantial liquid flow through the passage 78. When the disk 74 is spaced from the seat 76, the valve assembly 40 is open and liquid can flow through the passage 78 from the inlet 52 to the outlet 54. As seen in FIG. 9, the valve seat 76 is provided with a discontinuity in the form of a small notch 81. The purpose of the notch 81 is to permit a small, restricted bypass flow across the valve assembly 40 when the valve assembly is closed with the disk 74 in engagement with the valve seat 76.

The valve and clutch disk 74 is attached to the top upper end of a drive rod 82 of the flow interrupt assembly 38. As seen in FIG. 10, the upper end of the drive rod 82 is formed with an opposed pair of flats 84 defining opposed shoulders 86. The disk 74 has a complementary partly circular shape with opposed flats 88 and the disk 74 is supported above the shoulders 86. A spring clip 90 snaps into a groove 92 in the rod 82 to retain the disk 74. A clearance 94 between the disk 74 and the rod 82 permits a small restricted flow between the region under the clutch member 72 and the output port 54.

Figure 7:
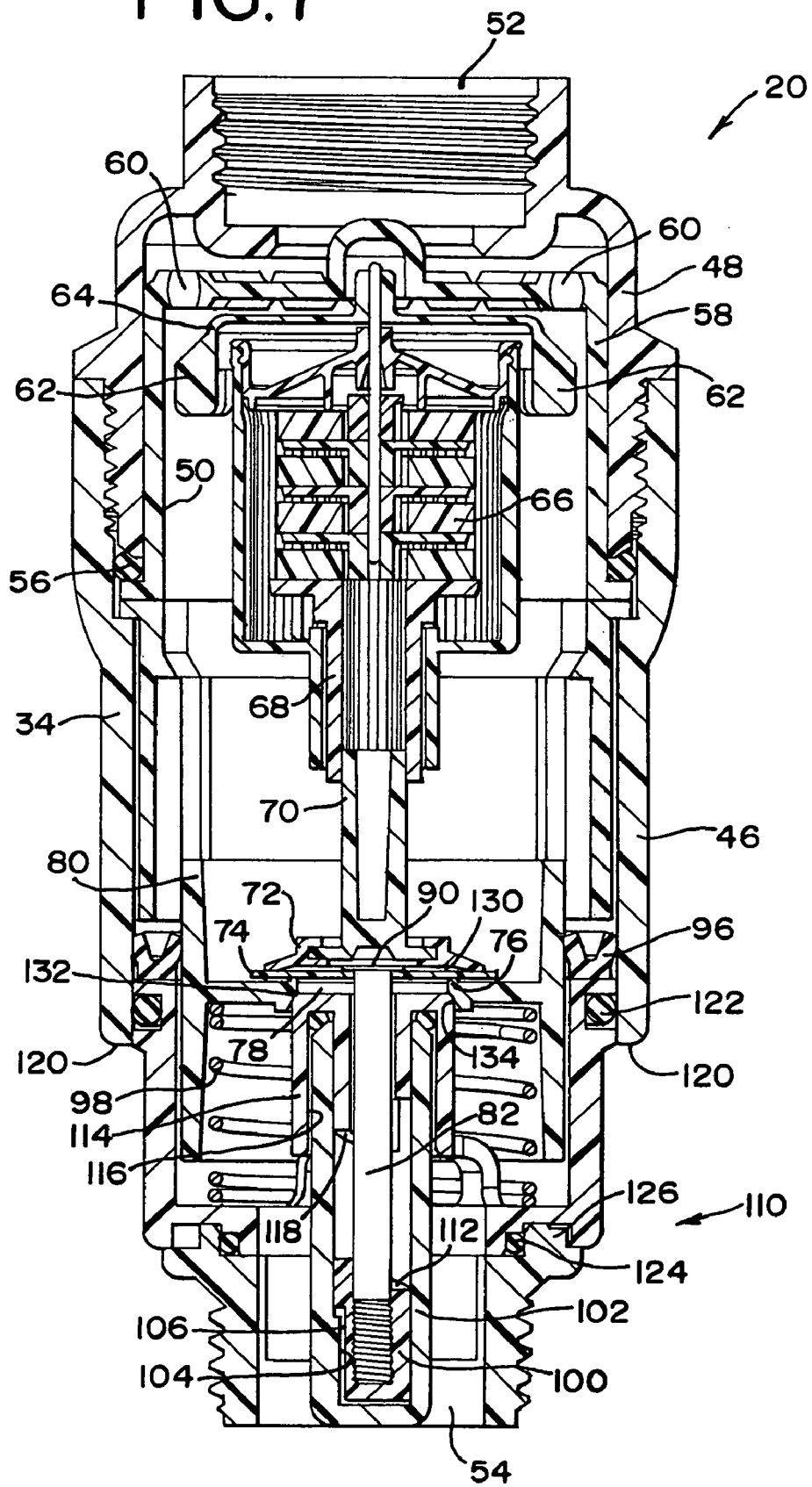
FIG. 7 is a view like FIG. 4 showing the device preventing further flow after a metered flow volume has occurred.

The piston 80 is supported within the housing 34 for vertical movement between an uppermost position seen in FIG. 4 and a lowermost operating position seen approximately in FIG. 7. A seal 96 permits this sliding movement while preventing flow of liquid around the piston 80. A coil piston return spring 98 continuously biases the piston 80 toward its upper position with a small force of a few pounds.

Figure 5:
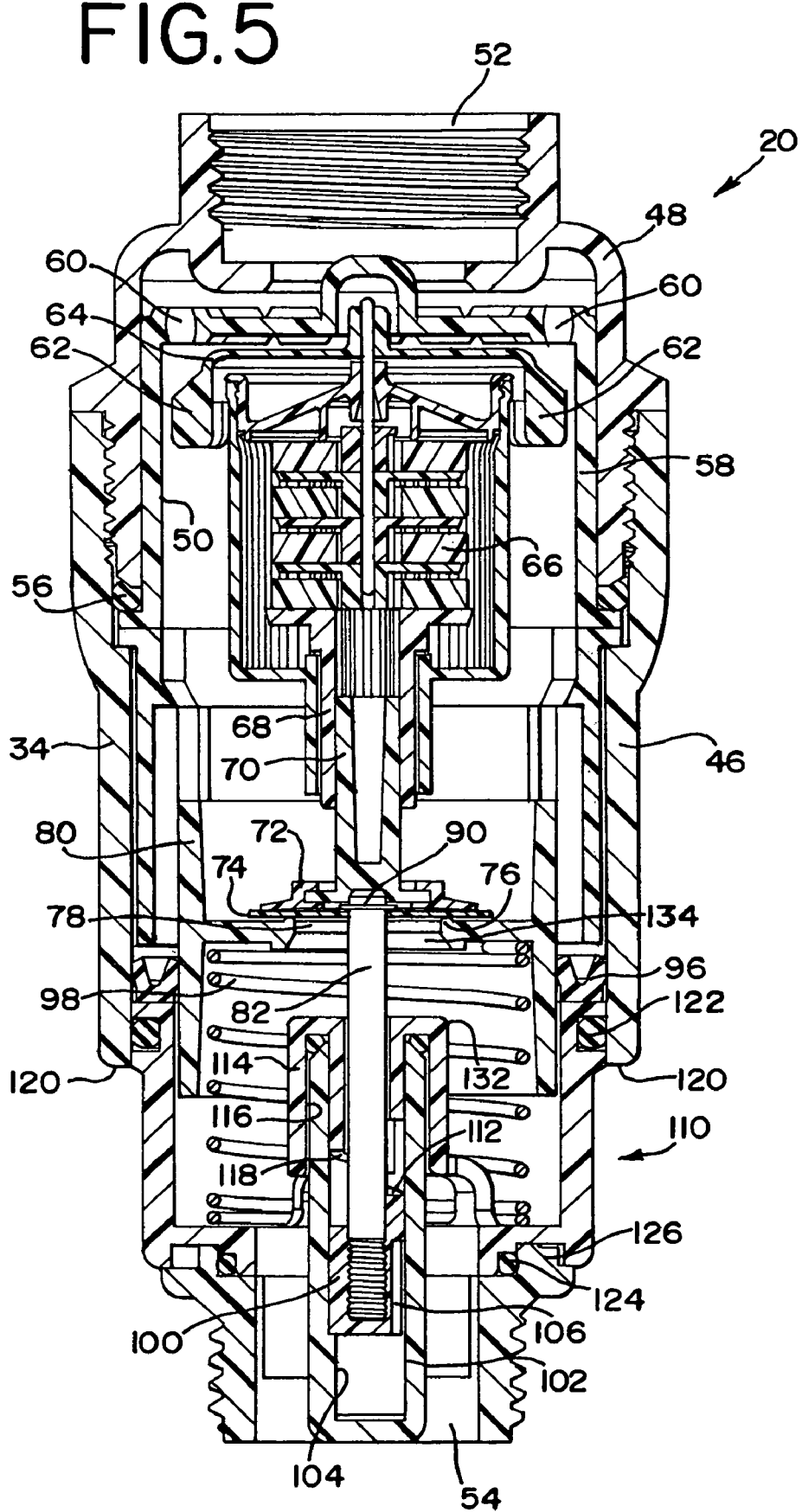
FIG. 5 is a view like FIG. 4 showing the device as flow through the device is beginning.
Figure 6:
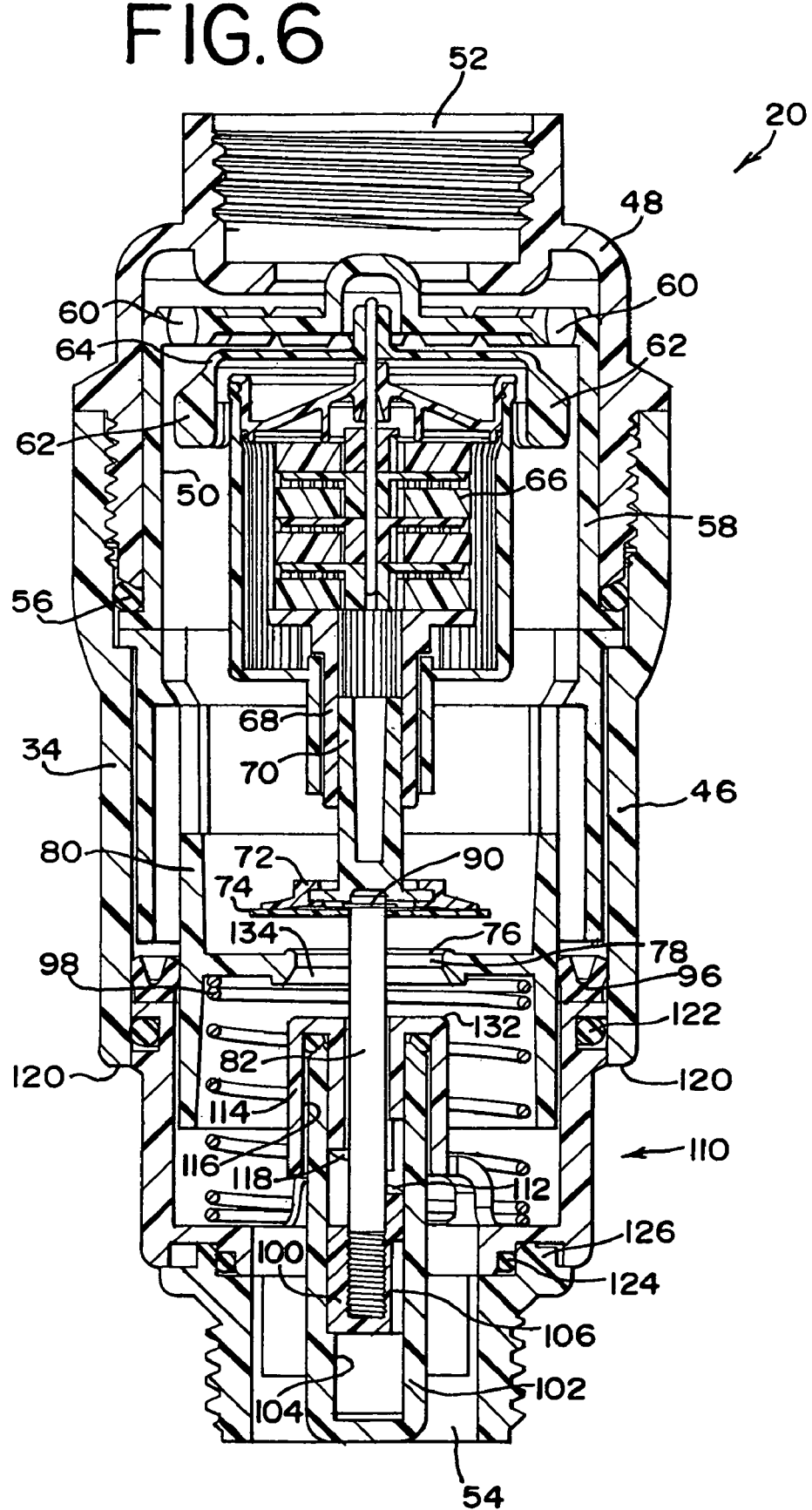
FIG. 6 is a view like FIG. 4 showing the device with continuing metered flow.

The flow interrupt assembly 38 includes a control, or stop and cam, member 100 fixed to the bottom of the drive rod 82. The member 100 is guided for rotation and for vertical sliding movement in a guide sleeve 102 formed in the lower portion of the base 46 of the housing 34. In most rotational positions of the control member 100, the member 100 bottoms against the top of a stop rib 104 formed within the guide sleeve 102 as seen in FIGS. 5 and 6. In one rotational position of the control member 100, referred to herein as the flow interrupt position, a slot 106 in the control member 100 is aligned with the stop rib 104, and the control member 100 is able to move further downward to the position seen in FIGS. 4 and 7.

A cam system 110 resets the flow interrupt assembly 38 after flow through the device 20. The cam system 110 includes a first, upwardly directed reset cam 112 in the form of an inclined cam surface at the top of the control member 100. The adjustment member 42 includes a central hub portion 114 having an annular recess 116 receiving the upper end of the guide sleeve 102. The hub portion 114 includes a second, downwardly directed reset cam 118. The control member 100 can move upward, resulting in engagement of the first cam 112 with the second reset cam 118. This engagement can cause rotation of the control member to an initial rotational position following flow through the device 20. The flow interrupt assembly 38 is reset with no flow through the device 20 because the notch or discontinuity 81 allows restricted flow across the valve seat 76.

The adjustment member 42 is rotatably mounted in the lower portion of the base 46 of the housing 34. A sliding fit of the sleeve portion 102 in the annular recess 116 journals the adjustment member for rotation. Windows 120 in the base 46 of the housing 34 permit the user to grasp and rotate the adjustment member 42 in order to position the reset cam 118 and select a maximum flow volume. Seals 122 and 124 prevent leakage of liquid through windows 120. A stop 126 is formed within the lower portion of the base 46 (FIGS. 4-8). The adjustment member 42 includes an internally directed stop projection 128, and engagement of the projection 128 with the stop 126 limits rotation of the adjustment member to slightly less than one full revolution.

Operation of the flow volume limiting device 20 is now described. To prepare the device for use, the user rotates the adjustment member 42 to select a maximum flow volume. Rotation of the adjustment member 42 determines the maximum rotational offset of the slot 106 of the control member 100 from the stop rib 104. This establishes the maximum rotation of the shaft 70, engaged clutch assembly 44, rod 82 and control member 100 permitted before the slot 106 in the control member 100 is aligned with the stop rib 104, and the control member 100 is able to move downward to the position seen in FIGS. 4 and 7. Because this rotation is determined by measurement of flow by the volume measuring assembly 36, this in turn sets a maximum flow volume permitted in any cycle of operation by the device 20.

For example, a typical water utilizing appliance such as a clothes washer may consume in the range of five to twenty gallons of water in each water supply cycle, such as the beginning of a wash cycle or rinse cycle. The device 20 preferably has a maximum volume adjustment range from a minimum of a few gallons to a maximum of, for example, fifty gallons. The user may select a maximum volume that slightly exceeds the requirement of a particular appliance. The surface of the adjustment member 42 may be provided with visible graduations or other indicia of the set volume. The device is connected into a water supply system such as the system 22 seen in FIG. 1, and the supply valve 26 is opened in preparation for operation of the appliance 24.

FIG. 4 illustrates the flow volume limiting device 20 in an initial, standby condition before the start of a water supply cycle. In this condition, the supply valve 26 of the water supply system 22 is open and the solenoid operated appliance valve 32 is closed, and there is no flow through the device 20 and no pressure differential between the inlet 52 and outlet 54. The piston return spring 98 holds the piston 80 in its upper position. The clutch assembly 44 is disengaged. The valve assembly 40 is closed. The control member 100, together with the attached rod 82 and valve and clutch disk 74, are in their initial position of maximum adjusted rotational displacement of the slot 106 from the stop rib 104.

When a water utilization cycle of the appliance 24 begins, the control valve 32 opens and flow through the device 20 is initiated. As seen in FIG. 5, a differential pressure force of a few pounds is imposed across the piston 80 by the force of the piston return spring 98 and the effect of initial inlet pressure. One result of this force is that the clutch assembly 44 is engaged to rotationally lock the volume measuring assembly 36 to the flow interrupt assembly 38. The flexible, resilient, elastomeric clutch member 72 initially has a concave, shallow cup shape (FIG. 4) defining a space 130 between the clutch member 72 and the disk 74. When the clutch assembly is subjected to a differential pressure force as seen in FIG. 5, liquid is expelled toward the outlet 54 from the space 130 through the restricted flow clearance 94 (FIG. 10) and the clutch member 72 is deformed and clamped firmly in flat, face to face engagement against the disk 74. With the clutch assembly engaged, the control member 100 rotates in response to liquid volume measured by the volume measuring assembly 36.

Another result of the initial differential pressure force is that the valve and clutch disk 74 is held against the valve seat 76, and the piston 80 moves downward, along with the splined drive shaft 70, the clutch assembly 44, the valve assembly 40 and the control member 100. This downward movement at the initiation of a water supply cycle continues until the control member 100 contacts the stop rib 104. This contact is beginning to occur in FIG. 5.

As seen in FIG. 6, when the control member 100 contacts the stop rib 104, downward movement of the splined drive shaft 70, the clutch assembly 44, the valve assembly 40 and the control member 100 ceases, while the piston 80 continues to move downward toward its lowermost position. The valve seat 76 moves away from the valve and clutch disk 74, and liquid flows through the valve flow port 78. The space between the disk 74 and the valve seat 76 forms a flow throttling gap, and a pressure differential of a few pounds across the throttling gap results from the force applied to the piston 80 by the piston return spring 98. The clutch assembly 44 is maintained in the clamed, engaged condition.

As flow continues, the engaged clutch assembly 44 causes the flow measuring assembly 38 to rotate the control member 100 from its initial position toward the maximum volume, flow interrupt position where the slot 106 registers with the stop rib 104. In normal operation with no failure in the water system 22, the appliance control valve 32 closes before the maximum flow volume occurs. When flow is discontinued, by the valve 32 or otherwise, the device 20 including the flow interrupt assembly 38 is reset to the initial condition.

In the absence of flow at the end of a normal water supply cycle, the clutch assembly 44 is disengaged as the resilient clutch member 72 returns to its original shape and the entry of liquid through the clearance 94 reestablishes the space 130. Any remaining residual frictional engagement between the periphery of the clutch member 72 and disk 74 is minimized by use of a low friction material such as an acetal or Polybutylene Terephthalate (PBT) for the disk 74. As a result, the rod 82, disk 74 and the control member 100 are able to rotate relative to the clutch member 72 and shaft 70.

In addition, at the end of a normal water supply cycle, the restricted flow through the notch or discontinuity 81 in the valve seat 76 permits the piston return spring 98 to gradually lift the piston 80 from its lower position of FIG. 6. As seen in FIG. 8, the cam surface 112 of the control member 100 engages the reset cam surface 118 of the adjustment member 42. The resulting cam action rotates the control member 100 and returns it to its initial rotational position, ready for a subsequent water supply cycle. This reset rotation is possible because the clutch assembly 44 is disengaged. After a short period of time, for example a few seconds, the piston is lifted to the initial position of FIG. 4 and the device 20 is reset to the initial condition, ready for the next water supply cycle.

In the event of a malfunction in the water system 22, such as rupture of the water supply hose 30, the volume of flow through the flow volume limiting device 20 may reach the maximum volume amount set by positioning of the adjustment member 42. When the maximum flow volume is reached, the volume measuring assembly 36 rotates the control member 100 to the flow interrupt position seen in FIG. 7 wherein the slot 106 in the member 100 is in alignment with the stop rib 104. The control member 100 moves down, along with the rod 82 and the valve and clutch disk 74. The disk 74 engages the valve seat 76 to interrupt flow through the device 20 and prevent flooding and damage due to the water supply malfunction. The piston 80 moves down to the position seen in FIG. 7 where a secondary seating area 132 atop the central hub portion 114 engages a bevel valve seat 134 surrounding the flow port 78. This provides a final seal preventing flow through the device 20. The clutch assembly 44 is disengaged as the space 130 expands because the differential pressure across the notch discontinuity 81 is dissipated.

Following a flow interrupt, the device 20 remains in the flow interrupt condition seen in FIG. 7 for as long as the supply valve 26 continues to apply substantial pressure to the inlet 52. The user may close the valve 26 and correct the system malfunction. When valve 26 is closed, the piston return spring raises the piston 82 and the device 20 including the flow interrupt assembly 38 is reset to the initial condition seen in FIG. 4.

While the present invention has been described with reference to the details of the embodiments of the invention shown in the drawing, these details are not intended to limit the scope of the invention as claimed in the appended claims.

What is claimed is:

1. A flow volume limiting device for use in a liquid supply system,
said flow volume limiting device comprising:
a housing having an inlet and an outlet;
a valve assembly for controlling flow though said housing;
a flow measuring assembly responsive to flow through said housing and providing a rotary output proportional to measured flow;
an interrupt assembly having a rotary control member closing said valve assembly in response to rotation of said control member in a first direction to an interrupt position;
a reset cam system engageable with said rotary control member and rotating said rotary control member in a second direction to an initial position, rotationally spaced from said interrupt position; and
a friction clutch assembly connected between said flow measuring assembly and said rotary control member;
said friction clutch assembly including an clutch member responsive to pressure resulting from flow in said housing for engaging said clutch assembly to rotationally couple said flow measuring assembly to said rotary control member in the presence of flow and disengaging said clutch assembly to rotationally decouple said flow measuring assembly from said rotary control member in the absence of flow.

2. A flow volume limiting device as claimed in claim 1, further comprising an adjustment member including said reset cam, said adjustment member being movably mounted in said housing for varying said initial position.

3. A flow volume limiting device as claimed in claim 1, said valve assembly including a flow passage, a valve seat surrounding said flow passage and a valve member movable relative to said valve seat.

4. A flow volume limiting device as claimed in claim 3, said valve member comprising a disk.

5. A flow volume limiting device as claimed in claim 4, said clutch member being frictionally engageable with said disk.

6. A flow volume limiting device as claimed in claim 5, said clutch member being a flexible, resilient cup shaped body member having a rim engageable with said disk, and a restricted bleed passage extending from the interior of said cup shaped body.

7. A flow volume limiting device as claimed in claim 5, said rotary control member being connected to said disk.

8. A flow volume limiting device as claimed in claim 1, further comprising a piston slideably mounted in said housing, said valve assembly including a flow passage in said piston, said piston including a valve seat surrounding said flow passage, and a valve member movable relative to said valve seat.

9. A flow volume limiting device as claimed in claim 8, said valve member being a disk having a first opposed surface engageable with said valve seat, said clutch member being engageable with a second opposed surface of said disk.

10. In a flow volume limiting device for use in a liquid supply system, the combination comprising:
a housing having an inlet and an outlet;
a piston slideably mounted in said housing for movement toward and away from said outlet, a flow passage through said piston, and a valve seat on said piston surrounding said flow passage;
a valve disk cooperating with said valve seat for opening and closing said flow passage;
a control member connected to said valve disk; and a stop engaged by said control member upon movement of said piston toward said outlet to stop said valve disk and open said valve assembly in response to further movement of said piston toward said outlet.

11. The combination of claim 10 further comprising a spring engaging said piston and urging said piston away from said outlet.

12. The combination of claim 11 further comprising a restricted flow passage across said valve seat.

13. The combination of claim 10 further comprising a rotating flow volume responsive element in said housing and a friction clutch assembly connected between said flow volume responsive element and said control member.

14. A flow volume limiting device for use in a liquid supply system and comprising:
   a housing defining a flow path;
   a flow responsive piston slideable along said flow path in downstream and upstream directions;
   a spring biasing said piston in the upstream direction;
   a flow passage through said piston and a valve seat on said piston surrounding said flow passage;
   a valve member cooperating with said valve seat to permit and prevent flow through said flow passage;
   a control element connected to said valve member;
   a stop engageable by said control member to stop downstream movement of said control member and valve during downstream movement of said piston to separate said valve member from said valve seat;
   a flow volume measuring assembly having an output shaft rotating in response to flow in said flow path;
   a friction clutch interconnecting said flow measuring assembly and said control element for rotating said control element in a first direction when said clutch is engaged;
   said friction clutch being exposed to liquid pressure differential in said flow path for engaging said clutch when flow is present and disengaging said clutch when flow is absent;
   a recess in said control element registering with said stop permitting downstream movement of said valve member against said valve seat in response to rotation of said control element to an interrupt position; and
   a reset cam engageable by said control element for rotating said control element in a second direction to an initial position in response to upstream movement of said control element.

15. A flow volume limiting device as claimed in claim 14, said friction clutch including a flexible, resilient cup connected to said output shaft; said cup being forced into flattened engagement with said valve member in response to flow in said flow path.

16. A flow volume limiting device as claimed in claim 15 further comprising a restricted bleed path communicating with the underside of said cup permitting separation of said cup from said valve member in the absence of flow in said flow path.

17. A flow volume limiting device as claimed in claim 16, said flow volume measuring assembly including a turbine wheel and a speed reduction gear assembly connected between said turbine wheel and said output shaft.

18. A flow volume measuring device as claimed in claim 14 further comprising an adjustment member movably supported in said housing, said reset cam being formed on said adjustment member for varying said initial position of said control member.

19. A flow volume limiting device as claimed in claim 1, wherein said clutch member is made of an elastomeric material.

20. A flow volume limiting device as claimed in claim 14, wherein said friction clutch comprises an elastomeric member.

21. The combination of claim 10, further comprising an adjustment member seated near said outlet, wherein said adjustment member includes a secondary seating area that is configured and arranged to engage a surface of said valve seat that is different from a surface engaged by said valve disk.

* * * * *